United States Patent [19]

Woodworth

[11] 4,357,044

[45] Nov. 2, 1982

[54] KEEPER DEVICE FOR PORTABLE ELECTRIC HAND-DRILLS

[76] Inventor: Clinton A. Woodworth, 9115 Meadow Dr., Omaha, Nebr. 68114

[21] Appl. No.: 261,659

[22] Filed: May 7, 1981

[51] Int. Cl.³ .............................................. A45C 11/24
[52] U.S. Cl. .................................. 294/137; 294/167; 224/268; 248/294
[58] Field of Search ............... 294/137, 167; 408/238, 408/239 R, 239 A; 224/268, 247, 907; 206/581, 427; 211/175; 248/220.4, 294

[56] References Cited

U.S. PATENT DOCUMENTS 2,985,349  5/1961  McGuire ............................ 224/248
3,128,022  4/1964  Mastrud, Jr. ....................... 294/167
3,770,234  11/1973  Fovall ................................ 248/294

Primary Examiner—James B. Marbert
Attorney, Agent, or Firm—George R. Nimmer

[57] ABSTRACT

Disclosed are keepers for carrying and suspendably storing portable electric hand-drills. The keeper device includes: an upright shank insertable into and removably secureable to the adjustably tightenable chuck of the hand-drill; a cord rack for draping convolutions of the hand-drill elongate electrical cord; and suspendable handle means to permit convenient interim storage of the keeper and hand-drill combination. In the preferred keeper embodiment, the shank, the cord rack (having backing and resilient finger parts), and the handling means are fabricated of permanently bent springy metallic rod stock.

11 Claims, 7 Drawing Figures

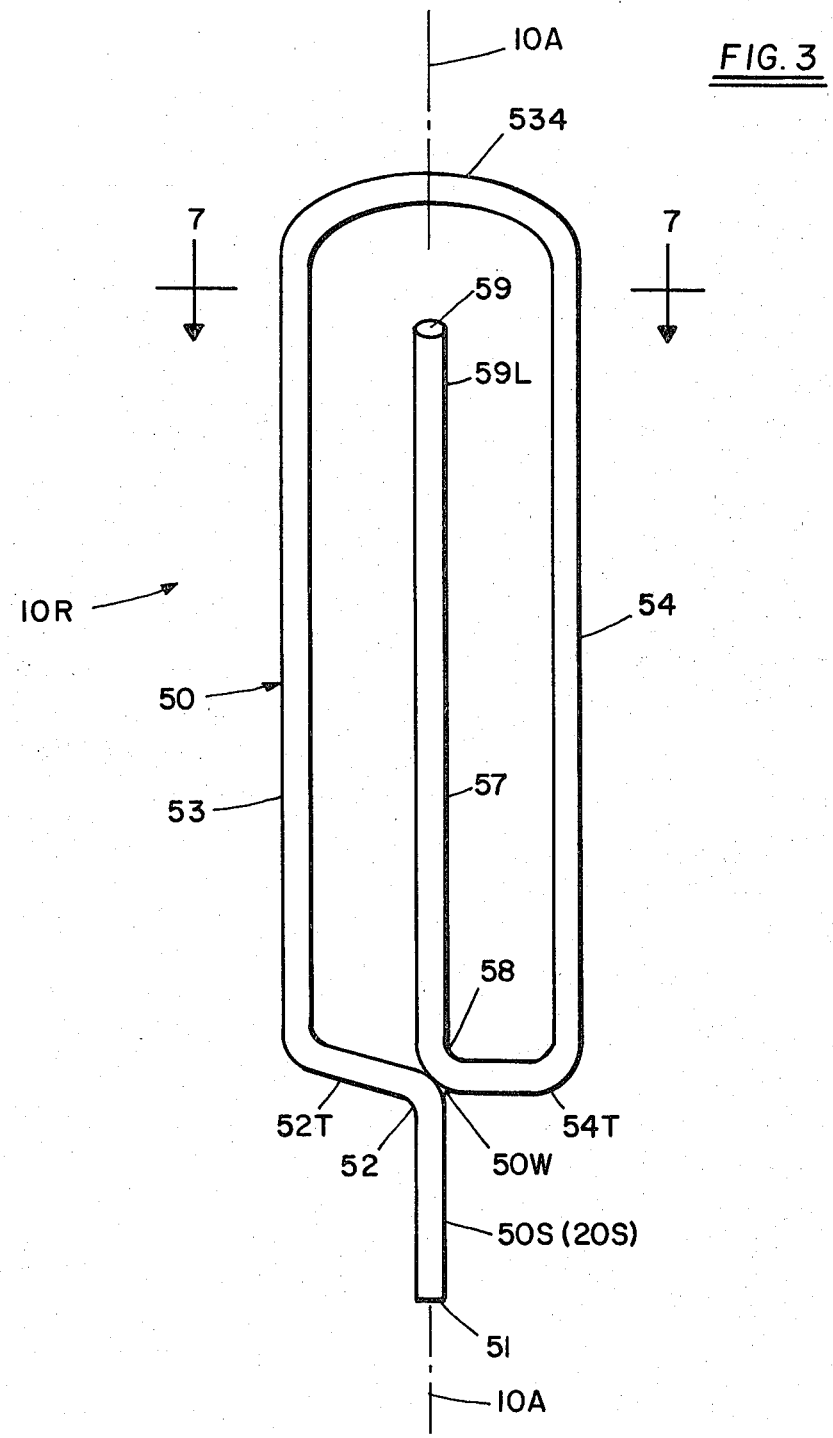

KEEPER DEVICE FOR PORTABLE ELECTRIC HAND-DRILLS

As alluded to in FIG. 2 of the drawing, portable electric hand-drills (e.g. 90) generally comprise a housing 90B for an electric motor powered through an elongate flexible electrical cord 95, there being a motor control switch 90C accessible from housing handle 94. The electric motor, through suitable transmission means (93), revolves a chuck 91 which is adjustably tightenable (92) to the drill-bit or other tool to be powerably revolved by said chuck. Heretofore, interim storage of such hand-drills (e.g. 90) has been difficult and cumbersome, subjecting the hand-drill parts to damage during such storage periods. Among the hand-drill parts most vulnerable during conventional interim storage are the chuck (91) and its transmission (93), the housed motor and its switch (90C), and the lengthy electrical cord (95) which is apt to become kinked, pinched, frayed, or otherwise subjected to damage.

It is accordingly the general objective of the present invention to provide a keeper device for carrying and suspendably storing portable electric hand-drills so as to prevent damage thereto during interim storage periods when the hand-drill is not required for operational use. It is an ancillary general objective to provide a keeper device that is simple and reliable to use and which can be made of economical and high quality construction.

With the above and other objects and advantages in view, which will become more apparent as this description proceeds, the keeper device for carrying and suspendably storing portable electric hand-drills extends uprightly along a longitudinal-axis and generally comprises: a shank extending uprightly along said longitudinal-axis, the shank bottom-end being insertable into and removably secureable to the hand-drill chuck; an upright cord rack extending longitudinally uprightly from the shank and for drapably supporting convolutions of the hand-drill elongate electrical cord, said cord rack including an upright backing part having a longitudinally and laterally extending inner-side adapted to support transversely against cord convolutions having a geometric center located below the shank, said cord rack also including an upright finger part having an upper free-end and being resiliently urged toward the backing part inner-side and the intervening cord convolutions; suspendable handle means attached to the cord rack backing part and located loftily above the keeper shank; and preferably, the shank, the cord rack, and the handle means components being provided of permanently bent springy metallic rod stock.

In the drawing, wherein like characters refer to like parts in the several views, and in which:

FIG. 3 is a forward elevational view of a preferred embodiment of the hand-drill keeper device of the present invention;

FIG. 4 is a left side elevational view of the FIG. 3 preferred embodiment;

FIG. 5 is a top plan view of the FIG. 3 embodiment;

FIG. 6 is a bottom plan view of the FIG. 3 embodiment; and

FIG. 7 is a sectional plan view taken along line 7—7 of FIGS. 3 and 4.

Figure 1:
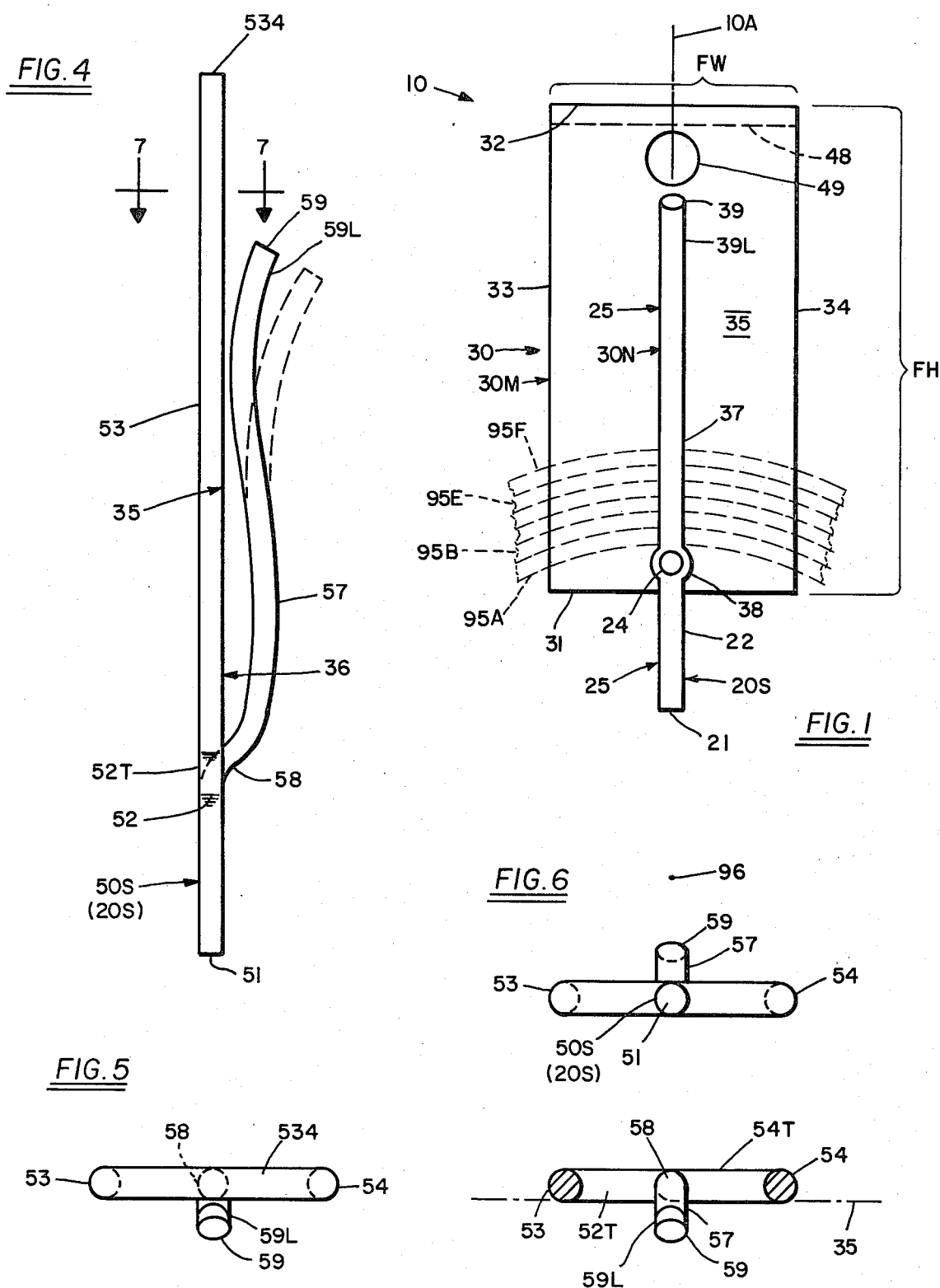
FIG. 1 is a forward elevational view of a first embodiment of the hand-drill keeper device of the present invention.
Figure 2:
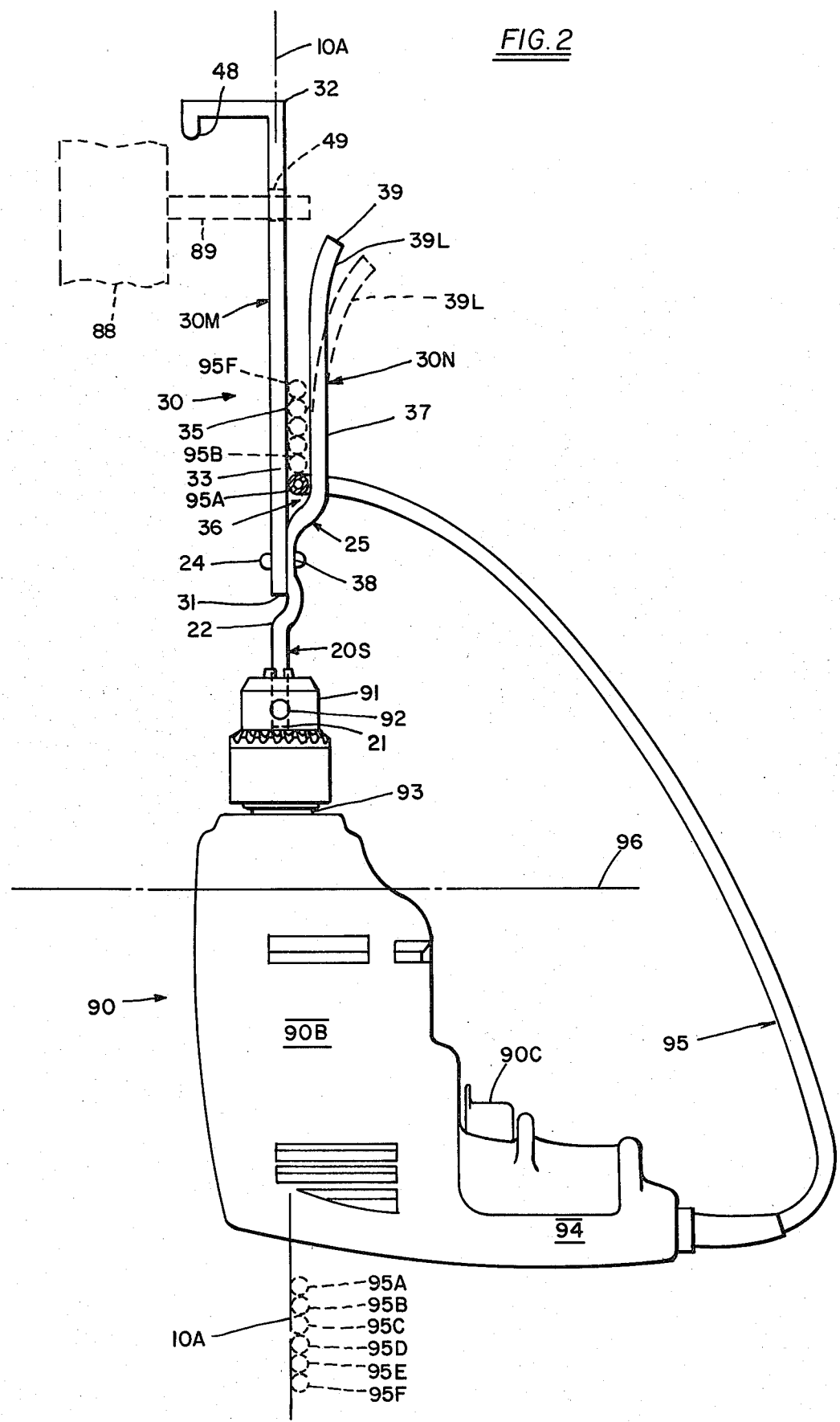
FIG. 2 is a left side elevational view of the FIG. 1 keeper embodiment shown in removable combination, for interim storage, with a conventional portable electric hand-drill.

The keeper device first embodiment 10 of FIGS. 1 and 2 extends uprightly along longitudinal-axis 10A and generally comprises an upright shank 20S for removable engagement with a hand-drill chuck (91), a cord rack 30 for drapably supporting convolutions (e.g. 95A–95F) of hand-drill flexible elongate cord 95, and suspendable handle means (e.g. 48, 49) attached to the cord rack backing part 30M loftily above shank 20S. Cord rack backing part 30M extends uprightly along longitudinal-axis 10A and is generally rectangular in form defining a laterally extending upper-end 32 remote from shank 20S, and a laterally extending lower-end 31 at shank top-end 22, there being backing finite-height "FH" between ends 31 and 32. Stiff backing 30M has a finite-width "FW" between upright-edges 33 and 34, and a longitudinally ("FH") and laterally ("FW") extending planar inner-side 35. As already alluded to regarding the handle means, backing 30M might be provided with a transversely extending aperture 49 axis 10A nearer to upper-end 32 and/or with a hook 48 extending transversely rearwardly of backing upper-end 32.

Though the shank (20S) and the cord rack finger part (30N) might be as separate components, in embodiment 10 a single length 25 of permanently bent springy rod stock is employed for the shank and the finger. In any event, the stiff upright shank (20S) requires a longitudinally linear bottom length terminating as shank bottom-end 21 to permit shank insertion into the hand-drill chuck (91), the shank top-end 22 being at the overlying cord rack 30.

The cord rack longitudinally extending finger part (e.g. 30N) has a lateral-extent lesser than the backing finite-width "FW", and has an upper free-end 39 located nearer to backing upper-end 32 than to lower-end 31. It is for the cord rack finger part (30N) to be normally resiliently urged transversely toward the backing part inner-side 35 so as to maintain the intervening (36) cord convolutions (e.g. 95A–95F having geometric center 96) transversely thereagainst. In this vein, the lower trailing length 37 of resilient finger 30N is bowed away from the backing whereby the distinct gap 36 between trailing length 37 and backing inner-side 35 accommodated the respective circular cord convolutions (e.g. 95A, etc.). The aggregate weight of the cord convultions, vertically supported against inner-side 35, is borne predominately by the bowed trailing length 37, which at its lower extremity 38 is joined to the backing lower-end. Preferably, the finger upper leadward-length 39L is located closer to backing inner-side 35 than is trailing length 37; however, leadward-length 39L diverts away from inner-side 35 for facilitating downward insertion of the vertically alignable (35) cord convolutions into gap 36. Springy rod stock is admirably suited for the resilient finger part 30N, the lower portion thereof being attached in cantilver fashion to the backing e.g. by rivet 24. As previously mentioned, a single length of permanently bent such springy rod stock might serve as both the shank (20S) and as the cord rack finger part 30N. If a metallic rod length 25 is employed, it might be flattened at finger lower extremity 38 and there riveted (24) to backing part 30M. Or, if resinous rods (25) and backing (30M) are employed, they might be thermoplastically or adhesively joined together at finger lower extremity 38.

As indicated in FIG. 2, the keeper structure (10), after having been removably engaged at shank 20S with the hand-drill chuck and at cord rack 30 with the hand-drill cord convolutions (95A–95F), can be readily carried about in a safe condition wherein the hand-drill is not apt to become damaged. Through the suspendable handle means (48, 49), the removable combination of keeper 10 and hand-drill 90 might be suspended during interim storage from a rafter (38) or from a lofty peg (39).

Keeper structure embodiment 10R of FIGS. 3-7 differs from embodiment 10 of FIG. 1 or 2 in that the entire keeper 10R is fabricated from a single length 50 of permanently bent rod stock having terminii 51 and 59. Rod end 51 provides the bottom-end of longitudinally linear shank 50S having top-end 52, and rod end 59 provides the upper free-end of resilient finger having leadward-length 59L, bowed trailing length 57, and lower extremity 58. The remainder of permanently bent rod stock length 50, from bend 52 to bend 58, is bent into five uniplanar lengths 52T, 53, 53A, 54 and 54T, thereby defining a planar inner-side 35 and gap 36. A connection between bent length 54T and shank length 50S ensures the aformentioned planar relationship 35, the gap 36, and the properly positioned resilient finger 58–59. Such connection might be a weld 50W if metallic rod stock is employed, or as a thermoplastic or adhesive connection if resinous rod stock is employed. The aperture formed by bent lengths 52T, 53, 53A, 54, and 54T, provides a suspendable handle means analagous to aperture 49 of embodiment 10.

From the foregoing, the construction and operation of the keeper device for portable electric hand-drills will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

What is claimed is as follows:

1. A keeper for carrying and suspendably storing a portable hand-drill of the general type including a housing, an adjustably tightenable chuck, and an elongate flexible electrical cord, said keeper extending uprightly along a longitudinal-axis and comprising:
   A. a shank extending uprightly along said longitudinal-axis and having a top-end and a bottom-end providing the keeper lower terminus, said shank bottom-end being insertable into and removably secureable to a hand-drill chuck, whereby the hand-drill housing is positionable wholly remotely below said keeper;
   B. an upright cord rack extending longitudinally rigidly uprightly from the shank top-end, said rack including a longitudinally extending upright backing part having a laterally extending finite-width between upright-edges for the backing, said backing including a longitudinally and laterally extending inner-side adapted to support transversely thereagainst convolutions of said flexible electric cord wherein the respective convolutions have a geometric center located below the shaft bottom-end, said rack also including a longitudinally extending upright finger part having a lateral-extent lesser than the backing finite-width and having an upper free-end, said upright finger lower portion being attached to the backing and said finger being resiliently urged toward the backing inner-side so as to maintain cord convolutions normally against the backing part of the cord rack; and
   C. suspendable handle means attached to the cord rack backing part and located loftily above the keeper shank.

2. The keeper structure of claim 1 wherein the cord rack finger part at the upper free-end has a terminal leadward-length located transversely away from the backing part inner-side, the major length of said finger part lower portion being located even further transversely away from the backing inner-side than is the finger leadward-length.

3. The keeper structure of claim 2 wherein the backing part has a laterally extending upper-end; wherein the finger part upper free-end is located below the elevation of the backing upper-end; and wherein the backing inner-side is substantially planar and coparallel with the keeper longitudinal-axis.

4. The keeper structure of claim 1 wherein the backing part is apertured to provide suspendable handle means.

5. The keeper structure of claim 4 wherein the shank, the cord rack, and the handle components are fabricated of bent rod stock.

6. The keeper structure of claim 1 wherein the backing part includes a hook to provide the suspendable handle means.

7. The keeper structure of claim 2 wherein the shank, the cord rack, and the handle components are provided of bent rod stock.

8. The keeper structure of claim 3 wherein the shank, the cord rack, and the handle means components are fabricated of permanently bent springy metallic rod stock.

9. The keeper structure of claim 1 wherein the backing part is generally planar and co-planar with the shank to provide an exceedingly compact keeper structure for carrying and suspendably storing a hand-drill from the adjustably tightenable chuck thereof.

10. The keeper structure of claim 9 wherein the shank, the cord rack, and the handle components are fabricated of bent rod stock.

11. The keeper structure of claim 10 fabricated of permanently bent springy metallic rod stock.

* * * * *